United States Patent
McDaniel et al.

(10) Patent No.: US 10,265,789 B1
(45) Date of Patent: Apr. 23, 2019

(54) COLD-WELD BURR REMOVAL

(71) Applicant: Southwire Company, LLC, Carrollton, GA (US)

(72) Inventors: Shelby Glen McDaniel, Ranburn, AL (US); Franklin Clarence Calhoun, Carrollton, GA (US); Robert D. Autrey, Carrollton, GA (US); Keefe M. Lane, Woodland, AL (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 15/725,518

(22) Filed: Oct. 5, 2017

(51) Int. Cl.
  *B23D 1/08* (2006.01)
  *B23D 79/02* (2006.01)
  *B23D 1/00* (2006.01)

(52) U.S. Cl.
  CPC ........... *B23D 79/021* (2013.01); *B23D 1/003* (2013.01); *B23D 1/08* (2013.01); *Y10T 409/50082* (2015.01); *Y10T 409/501968* (2015.01)

(58) Field of Classification Search
  CPC . Y10T 409/501148; Y10T 409/501476; Y10T 409/50164; Y10T 409/501968; Y10T 409/5041; Y10T 409/506232; Y10T 409/506396; Y10T 409/506724; Y10T 409/50738; Y10T 409/507872;
  (Continued)

(56) References Cited

U.S. PATENT DOCUMENTS

| | | | |
|---|---|---|---|
| 534,054 A * | 2/1895 | Schultz | B23D 79/00 409/310 |
| 2,852,985 A * | 9/1958 | Schlatter | B23D 79/026 409/300 |

(Continued)

FOREIGN PATENT DOCUMENTS

| | | | |
|---|---|---|---|
| CN | 101791744 | 8/2010 | |
| GB | 2107224 A * | 4/1983 | ........... B23K 20/028 |

(Continued)

OTHER PUBLICATIONS

STRECKER, "Buttwelding machines with STRECKER dual upset method," retrieved at http://sequem.fr/fournisseurs/strecker/?lang=en#1479117648635-9c406be8-1fc5 on Feb. 1, 2018, SEQUEM 2017.

*Primary Examiner* — Daniel W Howell
(74) *Attorney, Agent, or Firm* — Hartman & Citrin LLC

(57) ABSTRACT

A cold-weld burr removal system is disclosed according to various embodiments. The cold-weld burr removal system can include a clamping block having a clamping passage that extends along an alignment axis, and a removal block having a guide passage alignment axis centered about the alignment axis. The removal block can define a burr receiving chamber. The system also can include a cutting head insert having a cutting portion and a cutting passage. The cutting head insert can removably attach to the removal block and the cutting portion can protrude into the burr receiving chamber. The system can include a linear actuator that connects the clamping block to the removal block. The linear actuator can move the removal block in a direction along the alignment axis to increase a separation distance between the clamping block and the removal block when a linear actuation initiator initiates movement of the linear actuator.

20 Claims, 8 Drawing Sheets

(58) Field of Classification Search
CPC .. Y10T 409/503608; Y10T 409/50082; B23D 79/021; B23D 1/003; B23D 1/08; B23D 1/16; B23D 7/06; B23D 13/04
See application file for complete search history.

(56) References Cited

U.S. PATENT DOCUMENTS

| | | | | |
|---|---|---|---|---|
| 3,015,995 | A | * | 1/1962 | Fahy ................... B23D 79/02 409/300 |
| 4,076,441 | A | * | 2/1978 | Byrnes ................ B23D 79/12 29/33 F |
| 4,324,515 | A | * | 4/1982 | Ehling ............... B23D 79/021 219/97 |

FOREIGN PATENT DOCUMENTS

| | | |
|---|---|---|
| JP | H9270291 | 10/1997 |
| JP | 2003236670 | 8/2003 |
| JP | 2011131264 | 7/2011 |

* cited by examiner

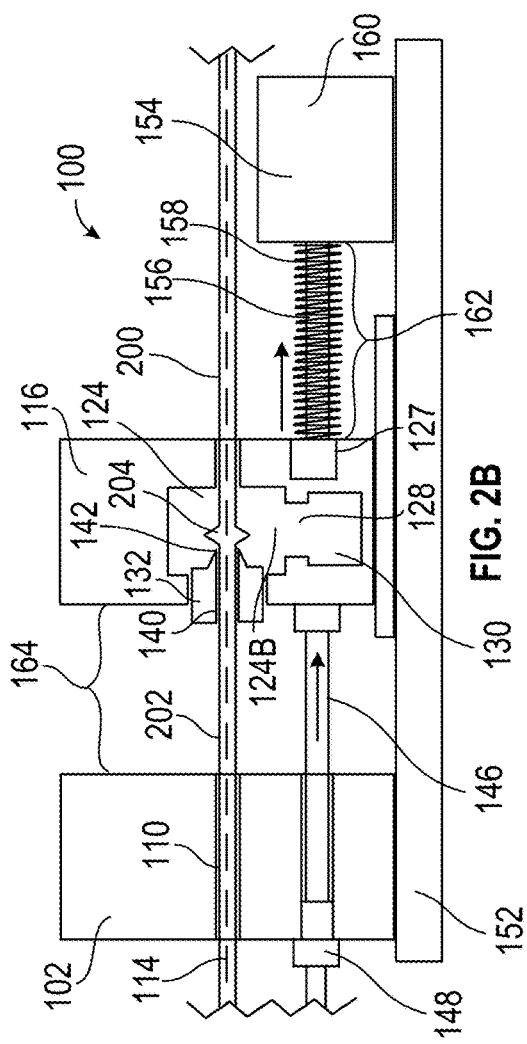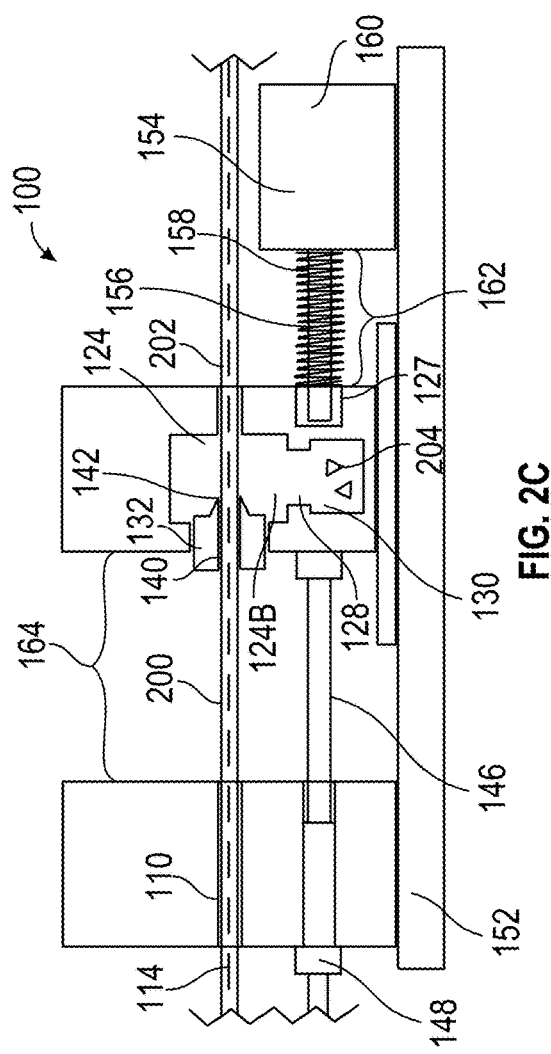

COLD-WELD BURR REMOVAL

BACKGROUND

The present disclosure is directed to removal of excess material, such as a cold-weld burr, that is the byproduct of material that has been cold-welded together through compression. Cold welding is a solid-state welding process in which a joint is created by joining parts together using pressure and physical contact of materials without heating and/or melting the material to a liquid phase. Unlike fusion-welding which implements a liquid or molten phase to form a joint, the process of cold welding allows material surfaces to adhere or otherwise bond to each other through compression in order to form a joint. For example, opposing faces of two metal wires or rods can be compressed together until the two separate pieces adhere to form a joint. A byproduct of cold welding is the production of the cold-weld burr, which is a build-up of material at the location where the joint is formed (i.e., welding point). The cold-weld burr can extend around the welding point and can arise from the compression of the materials. In some instances, the cold-weld burr can have a material hardness at the welding point that is greater than the material in other locations. The cold-weld burr can have sharp edges that may pose a danger to technicians handling the metal wire or rod that has undergone the cold-welding process. Additionally, if the cold-weld burr is not removed, the rods may not be able to be stored as efficiently due to the increased width caused by the cold-weld burr protruding from the body of the rod. As such, removal of the cold-weld burr can reduce accidents and allow for more compact storage. It is with respect to these and other considerations that the disclosure made herein is presented.

SUMMARY

The present disclosure is directed to concepts and technologies of cold-weld burr removal. A cold-weld burr removal system of the present disclosure can include a clamping block, a removal block, a cutting head insert, and a linear actuator. The clamping block can include a clamping passage that extends along an alignment axis. In embodiments, the clamping block comprises a hinge, an upper clamp portion, and a lower clamp portion. The clamping block can open via the hinge so as to allow the clamping passage to receive a portion of the rod. The removal block can include a guide passage alignment axis centered about the alignment axis, where the removal block can define a burr receiving chamber. The burr receiving chamber can accept a cold-weld burr of a rod. In embodiments, the removal block can include a removal block hinge, an upper removal block portion, and a lower removal block portion. The removal block can open via the removal block hinge so as to allow the burr receiving chamber to receive a cold-weld burr attached to a portion of the rod. In embodiments, the burr receiving chamber can encapsulate at least a portion of the cutting head insert. The cutting head insert can removably attach to the removal block. The cutting head insert can include a cutting portion and a cutting passage centered about the alignment axis. The cutting portion can include a cutting edge. The cutting edge can remove at least some of the cold-weld burr from the rod via a shearing force that is created when the removal block moves away from the clamping block via the linear actuator. The cutting edge can remove the cold-weld burr while the rod remains stationary in the clamping block. The cutting portion can protrude into the burr receiving chamber in response to the cutting head insert being removably attached to the removal block. In some embodiments, the cutting portion can define a frustum that is non-uniform in length, and the cutting passage can extend along the alignment axis through the frustum. In some embodiments, the clamping passage can have a diameter that is smaller than a diameter of at least a portion of the cutting passage. The linear actuator can connect the clamping block to the removal block. The linear actuator can move the removal block in a direction along the alignment axis so as to increase a separation distance between the clamping block and the removal block in response to a linear actuation initiator initiating movement of the linear actuator. In some embodiments, the cold-weld burr removal system also can include a linear return assembly that returns the removal block back towards the clamping block after the separation distance has increased. In some embodiments, the cold-weld burr removal system also can include a burr collector. The removal block can define a burr transfer passage that extends from the burr receiving chamber to the burr collector.

In another configuration, a cold-weld burr removal system can include a clamping block, a removal block, a cutting head insert removably attached to the removal block, at least two linear actuators, and a linear return assembly. The clamping block can include a clamping passage that extends along an alignment axis. The clamping block can also include a hinge, an upper clamp portion, and a lower clamp portion. The clamping block opens via the hinge so as to allow the clamping passage to receive a portion of a rod. The removal block can include a guide passage centered about the alignment axis. The removal block can include a removal block hinge, an upper removal block portion, and a lower removal block portion. The removal block also can define a burr receiving chamber, where the burr receiving chamber can accept a cold-weld burr of a rod. The removal block can open via the removal block hinge so as to allow the burr receiving chamber to receive the cold-weld burr attached to a portion of the rod. The cutting head insert can removably attach to the removal block. The cutting head insert can include a cutting portion and a cutting passage centered about the alignment axis. The cutting portion can protrude into the burr receiving chamber in response to the cutting head insert being removably attached to the removal block. In some embodiments, the burr receiving chamber encapsulates at least a portion of the cutting head insert. In some embodiments, the clamping passage is configured to have a diameter that is smaller than a diameter of at least a portion of the cutting passage. The cutting portion of the cutting head insert can include a cutting edge. The cutting edge can remove at least some of the cold-weld burr from the rod via a shearing force that is created when the removal block moves away from the clamping block via the linear actuator. The cutting edge of the cutting head insert can remove the cold-weld burr while the rod remains stationary in the clamping block. In some embodiments, the cutting portion can define a frustum that is non-uniform in length. The cutting passage can extend through the frustum along the alignment axis. The system can include at least two linear actuators that connect the clamping block to the removal block. Each linear actuator can move the removal block in a direction along the alignment axis so as to increase a separation distance between the clamping block and the removal block in response to a linear actuation initiator initiating movement of the linear actuator. The clamping block can hold the rod in place while the linear actuator moves the removal block. In some embodiments, a linear return assembly can return the removal block back towards the clamping block after the separation distance has increased. In some embodiments, the system can include a burr collector. The removal block can define a burr transfer passage that extends from the burr receiving chamber to the burr collector.

The present disclosure is further directed to a method of removing a cold-weld burr from a rod. The method can include providing a cold-weld burr removal system. The cold-weld burr removal system can include a clamping block, a removal block, a cutting head insert attached to the removal block, and a linear actuator that connects the clamping block to the removal block so as to allow for linear movement of the removal block along an alignment axis. The removal block can include a burr receiving chamber. The method also can include providing a rod that has a cold-weld burr. The method can include placing the rod along the alignment axis such that the cold-weld burr is located within at least a portion of the burr receiving chamber. The method can include securing, via the clamping block, a portion of the rod while the cold-weld burr is located within at least the portion of the burr receiving chamber. The method can include encapsulating, via the removal block, the cold-welded burr within the burr receiving chamber. The method also can include removing the cold-weld burr from the rod by moving, via the linear actuator, the removal block away from the clamping block so as to provide a shearing force that separates the cold-weld burr from the rod. In some embodiments, the method also can include transferring, via a burr transfer passage, the cold-weld burr to a burr collector that is located underneath the removal block. In some embodiments, the method also can include returning, via a linear return assembly of the cold-weld burr removal system, the removal block back towards the clamping block after removing the cold-weld burr from the rod.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DESCRIPTION OF THE DRAWINGS

The accompanying drawings, which are incorporated in and constitute a part of this disclosure, illustrate various embodiments of the present disclosure. In the drawings:

FIG. 2B illustrates a cross-sectional view in which the rod is held in place in the cold-weld burr removal system shown in FIG. 2A prior to removal of the cold-weld burr, according to concepts of the present disclosure.

FIG. 2C illustrates a cross-sectional view at a time when the cold-weld burr is removed from the rod via the cold-weld burr removal system shown in FIGS. 2A and 2B, according to concepts of the present disclosure.

DETAILED DESCRIPTION

Figure 1A:
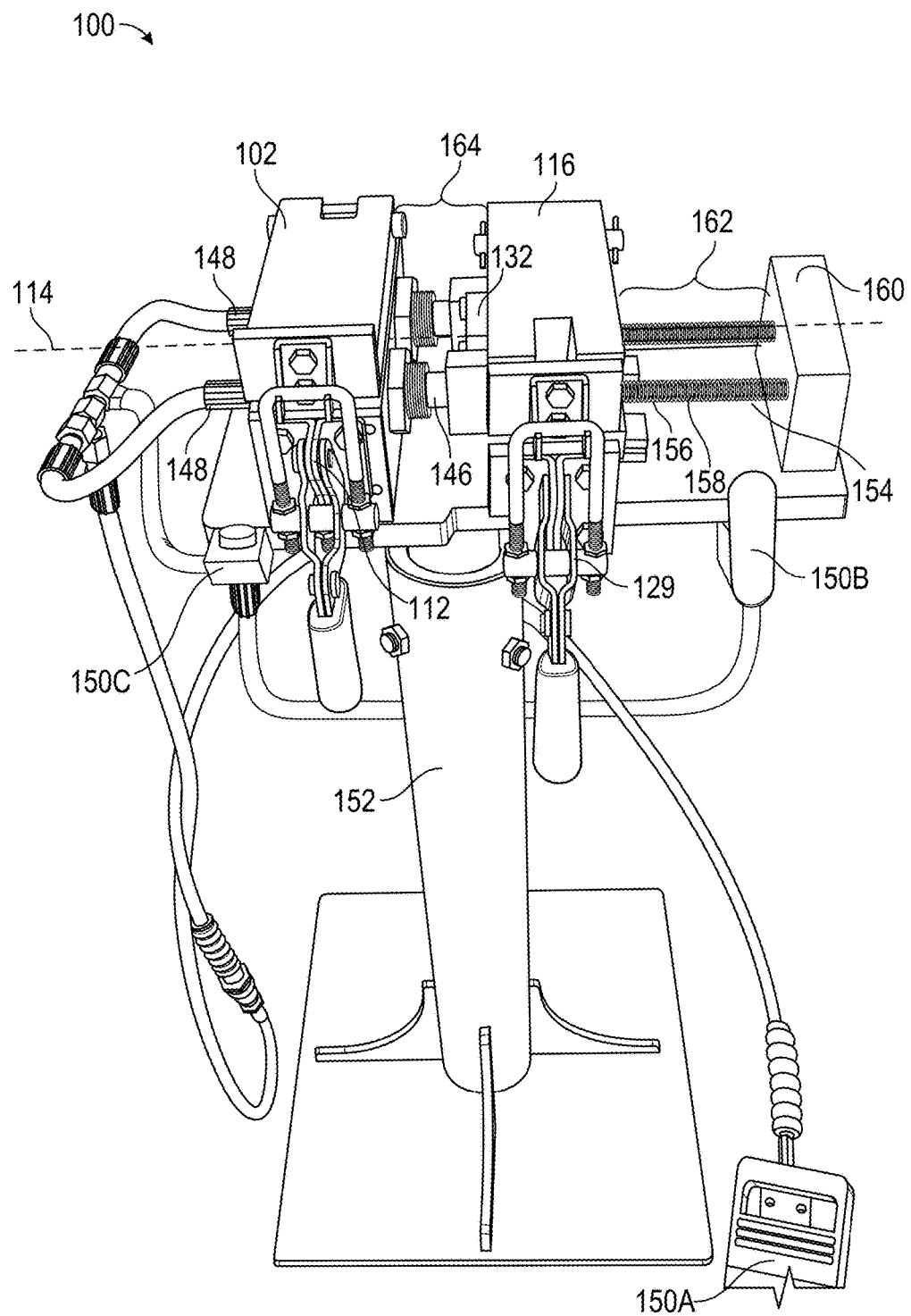
FIG. 1A illustrates a perspective view of a cold-weld burr removal system in which a clamping block and a removal block are in a closed position, according to illustrative embodiments.

The following detailed description is directed to a cold-weld burr removal system and methods of cold-weld burr removal. More particularly, the detailed description is directed to embodiments of a cold-weld burr removal system that allows for the separation and removal of a cold-weld burr from a rod, wire, or other metal material. According to some implementations, a cold-weld burr removal system can be implemented to separate or otherwise remove a cold-weld burr from a rod, wire strip, or other material that has undergone a cold-weld process that produces a cold-weld burr. The cold-weld burr removal system can secure a rod via a clamping block, thereby allowing the rod to remain stationary while the cold-weld burr of the rod is being removed. A removal block can include a burr removing chamber in which the cold-weld burr of the rod is placed. When the removal block is in a closed position, the cold-weld burr can be encapsulated by the burr removing chamber. A cutting head insert can be removably attached to the removal block. A cutting edge of the cutting head insert can be located within the burr removing chamber so as to be proximate and/or adjacent to the cold-weld burr located therein. One or more linear actuators can cause the removal block to linearly move along an alignment axis while the rod remains stationary in the clamping block. While the rod is stationary, the cutting edge of the cutting head insert can provide a shearing force that can remove or otherwise separate the cold-weld burr from the rod. The cold-weld burr is contained within the burr removing chamber during the removal process, thereby ensuring that at least a portion of the cold-weld burr is safely removed from the rod. If all of the cold-weld burr is not separated or removed from the rod, a linear return assembly can return the removal block to its original starting position back toward the clamping block, where the removal process can repeat by the linear actuator again moving the removal block away from the clamping block. Although embodiments of the cold-weld burr removal system are sometimes described in terms of holding a rod and/or removing at least a portion of a cold-weld burr from the rod, it should be understood that the embodiments of the present disclosure may additionally or alternatively be used in other contexts to hold variously shaped cold-welded materials and separate or otherwise remove excess byproducts from an edge or perimeter of the materials. As such, the particular implementations described herein should not be construed as being limiting in any way. This description provides various components, one or more of which may be included in particular implementations of the systems, methods, and apparatuses disclosed herein. In illustrating and describing these various components, however, it is noted that implementations of the embodiments disclosed herein may include any combination of these components, including combinations other than those shown in this description.

Figure 1B:
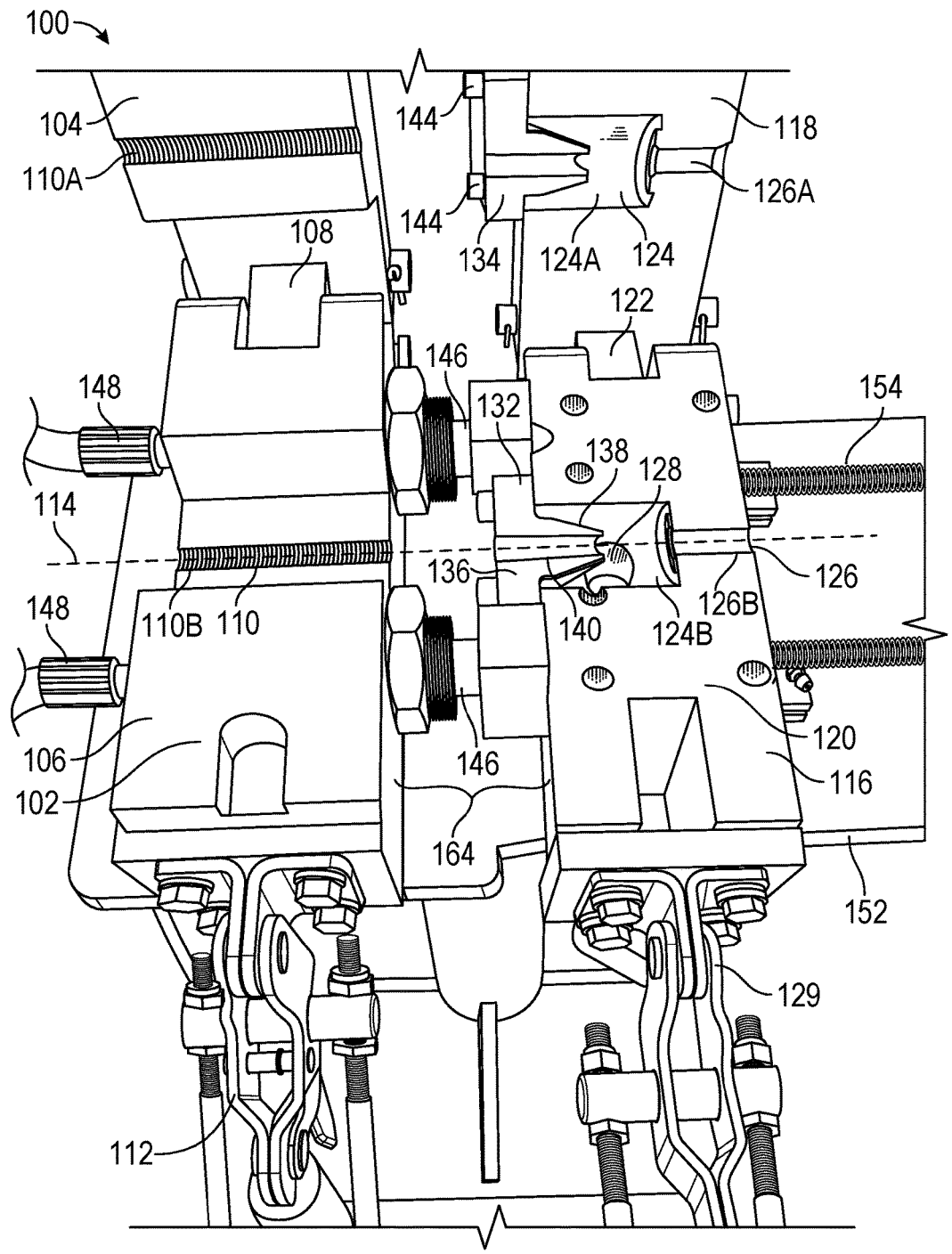
FIG. 1B illustrates a perspective view of aspects of a cold-weld burr removal system in which a clamping block and a removal block are in an open position, according to illustrative embodiments.

Turning now to FIGS. 1A and 1B, a perspective view of a cold-weld burr removal system 100 in which a clamping block and a removal block are in a closed position and open position, respectively, is disclosed, according to an embodiment. The cold-weld burr removal system 100 can include a clamping block 102, a removal block 116, a cutting head insert 132, and a linear actuator 146. In some embodiments, the cold-weld burr removal system 100 can include a support mount 152 that has a stand, table, planar surface, and/or other support structure to which the clamping block 102, the removal block 116, the linear actuator 146, and/or other components can be mounted. The cold-weld burr removal system 100 can be oriented about an alignment axis 114, where the alignment axis 114 extends orthogonally to a length of the clamping block 102 and a length of the removal block 116. The clamping block 102 can have an upper clamp portion 104 and a lower clamp portion 106. The clamping block 102 also can define a clamping passage 110 that can extend along the alignment axis 114. The clamping passage 110 can be formed by an upper clamping passage portion 110A and a lower clamping passage portion 110B. Each of the upper clamping passage portion 110A, and the lower clamping passage portion 110B can be in the shape of a half-circular channel. The upper clamp portion 104 can define the upper clamping passage portion 110A and the lower clamp portion 106 can define the lower clamping passage portion 110B. The upper clamp portion 104 can pivot or rotate relative to the lower clamp portion 106 via a hinge 108. The hinge 108 can rotate about a hinge axis that is parallel to the alignment axis 114. The hinge 108 can allow the clamping block 102 to open and close. When the clamping block 102 is in the closed position, such as shown in FIG. 1A, the upper clamping passage portion 110A is adjacent to and facing the lower clamping passage portion 110B. When the clamping block 102 is in the open position, such as shown in FIG. 1B, the upper clamp portion 104 rotates via the hinge 108 so that upper clamping passage portion 110A is no longer adjacent to or facing the lower clamping passage portion 110B. This can allow a rod to be placed within the lower clamping passage portion 110B along the alignment axis 114. The clamping passage 110 can be sized so as to be in frictional contact with the rod placed therein when the clamping block 102 is in the closed position. In some embodiments, the clamping passage 110, the upper clamping passage portion 110A, and/or the lower clamping passage portion 110B can have threads, grooves, ridges, or other frictional contact points that provide a clamping force when a rod is located therein. In some embodiments, the clamping passage 110 can be a separate component and/or piece of material from the clamping block 102. The clamping passage 110 can be removably attached to the clamping block 102 to allow varying sized clamping passages to be used to accommodate rods of various diameters and/or other materials with various shapes and sizes. In some embodiments, the clamping block 102 can be secured or otherwise held in a closed position via a clamping block retainer 112. Examples of the clamping block retainer 112 include, but should not be limited to, a clamp, a clasp, a bolt, or other securing mechanism that allows the upper clamp portion 104 to be positioned adjacent to or otherwise facing the lower clamp portion 106 while the cold-weld burr removal system 100 is or is not being used.

The removal block 116 can include an upper removal block portion 118 and a lower removal block portion 120. The removal block 116 can include a guide passage 126 that is centered about, and extends along, the alignment axis 114. The guide passage 126 can be in line or substantially in line with the clamping passage 110. The guide passage 126 can be formed by an upper guide passage portion 126A and a lower guide passage portion 126B. Each of the upper guide passage portion 126A and the lower guide passage portion 126B can be in the shape of a half-circle so as to form a channel. The upper removal block portion 118 can define the upper guide passage portion 126A, and the lower removal block portion 120 can define the lower guide passage portion 126B. The upper removal block portion 118 can pivot or rotate relative to the lower removal block portion 120 via a hinge 122. The hinge 122 can rotate about an axis that is parallel to the alignment axis 114. The hinge 122 can allow the removal block 116 to open and close. When the removal block 116 is in the closed position, such as shown in FIG. 1A, the upper guide passage portion 126A of the upper removal block portion 118 is adjacent to and facing the lower guide passage portion 126B of the lower removal block portion 120. When the removal block 116 is in the open position, such as shown in FIG. 1B, the upper removal block portion 118 rotates via the hinge 122 so that the upper guide passage portion 126A is no longer adjacent to or facing the lower guide passage portion 126B. Thus, when in the open position, a portion of the rod can be placed within the lower guide passage portion 126B of the removal block 116. When the removal block 116 is closed, the upper guide passage portion 126A can surround the portion of the rod that is located within the lower guide passage portion 126B. Unlike the clamping passage 110 of the clamping block 102 which can be configured to grasp and/or clamp onto a rod placed therein, when the removal block 116 is in the closed position, the guide passage 126 can be sized so as to guide the rod along the alignment axis 114, but not clasp or grip the rod. Thus, while the clamping block 102 can be configured to prevent or restrict relative motion between the rod and the clamping passage 110 of the clamping block 102, the removal block 116 can be configured to allow for the guide passage 126 of the removal block 116 to move relative to the rod, which is held stationary via the clamping passage 110. Put differently, the clamping block 102 can hold the rod stationary via the clamping passage 110, while the guide passage 126 of the removal block 116 can surround the outer circumference of the rod, but not grip or otherwise attempt to provide a constant normal force against the rod, thereby allowing the removal block 116 to move linearly back and forth along the alignment axis 114 while the rod remains stationary via the clamping block 102. As such, the guide passage 126 can have a diameter that is larger than a diameter of the clamping passage 110 and a diameter of the rod. In some embodiments, the guide passage 126 can be a separate component and/or piece of material from the removal block 116. The guide passage 126 can be removably attached to the removal block 116 to allow varying sized guide passages to be used to accommodate rods of various diameters and/or other materials with various shapes and sizes. In some embodiments, the removal block 116 can be secured or otherwise held in a closed position via a removal block retainer 129. Examples of the removal block retainer 129 include, but should not be limited to, a clamp, a clasp, a bolt, or other securing mechanism that allows the upper removal block portion 118 to be positioned adjacent to or otherwise facing the lower removal block portion 120 while the cold-weld burr removal system 100 is or is not being used.

The removal block 116 also can include a burr receiving chamber 124. The burr receiving chamber 124 can be oriented and centered about the alignment axis 114. The burr receiving chamber 124 can be located adjacent to the guide passage 126. In embodiments, the burr receiving chamber 124 can be defined as a cylindrical-shaped chamber that has an upper chamber portion 124A and a lower chamber portion 124B. The upper removal block portion 118 can define the upper chamber portion 124A as a half cylinder shape, and the lower removal block portion 120 can define the lower chamber portion 124B as a complimentary half cylinder shape. The burr receiving chamber 124 can be sized to receive or otherwise accept at least a portion of a cold-weld burr that is attached to a rod. When the removal block 116 is in the open position, the rod can be placed along the alignment axis 114 and rest in the lower guide passage portion 126B of the removal block 116. The rod can be positioned such that the cold-weld burr is located at least partially within the lower chamber portion 124B when the removal block 116 is in the open position. When the removal block 116 is transitioned to be in the closed position, the upper chamber portion 124A can surround the cold-weld burr such that the burr receiving chamber 124 encapsulates at least a portion and/or all of the cold-weld burr attached to the rod. This can safeguard a technician from sharp or otherwise dangerous edges of the cold-weld burr during the removal process. The burr receiving chamber 124 also can be sized to receive at least a portion of a cutting head insert, such as the cutting head insert 132 or the cutting head insert 132'. The cutting head insert 132 can include an upper insert portion 134 and a lower insert portion 136. The cutting head insert 132 can define a cutting portion 138 and a cutting passage 140. Further discussion of the cutting head insert 132 is provided in further detail below.

The cold-weld burr removal system 100 also can include a linear actuator 146. The linear actuator 146 can be located between the clamping block 102 and the removal block 116. In some embodiments, the linear actuator 146 has a linear rod or piston that extends through the clamping block 102 towards the removal block 116. The linear actuator 146 can attach to one or more actuation connector 148 that supply the linear actuator 146 with energy to actuate or otherwise move. The linear actuator 146 can be electric (powered via electric current), hydraulic (powered by hydraulic fluid pressure differential), and/or pneumatic (powered by pneumatic pressure differential). It is understood that the examples are provided for illustration purposes only and should not be construed as limiting the disclosure in any way.

The linear actuator 146 can respond to a control signal, pressure differential, and/or other input from a linear actuation initiator component. The cold-weld burr removal system can include one or more linear actuation initiator components 150A-150C (referred to herein collectively as the linear actuation initiator 150). In the illustrated embodiment of FIG. 1A, the linear actuation initiator component 150A includes a foot pedal, the linear actuation initiator component 150B includes a lever, and the linear actuation component 150C includes a push button. However this may not necessarily be the case in various embodiments. In some embodiments, the linear actuation initiator 150 can include one or more of a valve, a switch, a push button, a foot pedal, a lever, and/or other trigger mechanisms. The linear actuation initiator 150 can provide an input trigger to supply energy (e.g., electric, hydraulic, and/or pneumatic) to the linear actuator 146 via the actuation connector 148. In some embodiments, the linear actuation initiator 150 can be operated in a sequence of one or more of the linear actuation initiator components 150A-150C being depressed, pulled, and/or otherwise initiated so as to trigger linear actuation of the linear actuator 146. In other embodiments, the linear actuation initiator 150 can require simultaneous operation of one or more of the linear actuation initiator components 150A-150C being depressed, pulled, and/or otherwise initiated so as to trigger linear actuation of the linear actuator 146. In some embodiments, the use of the linear actuation initiator 150 may enhance worker safety by requiring a worker's hands and/or feet to be in contact with the linear actuation initiator 150 in order to trigger linear actuation of the linear actuator 146 which, in turn, causes the worker's hands and/or feet to be away from any pinch points and/or areas of motion while the cold-weld burr removal system 100 is in operation. For example, when the linear actuation initiator 150 includes both the linear actuation initiator component 150B and the linear actuation initiator component 150C, the worker's hands must be in contact with the linear actuation initiator component 150B and the linear actuation initiator component 150C in order to trigger linear actuation of the linear actuation 146, causing the worker's hands to be away from any pinch points and/or areas of motion while the cold-weld burr removal system 100 is in operation. It is understood that various embodiments may include the use of one, many, or none of the linear actuation initiator components 150A-150C illustrated in FIG. 1A and that the illustrated embodiments of the linear actuation initiator components 150A-150C are illustrative and should not be construed as limiting in any way.

When the clamping block 102 and the removal block 116 are not in operation or in a resting state, the clamping block 102 and the removal block 116 are separated a predefined distance, which is referred to as a separation distance 164. The separation distance 164 can have a first or original starting distance when the linear actuator 146 is fully retracted between the clamping block 102 and the removal block 116. When the linear actuation initiator 150 is triggered (e.g., via a technician stepping on a foot pedal, depressing a push button, and/or pulling a lever), the linear actuator 146 can respond by moving the removal block 116 in a direction that is away from the clamping block 102 along the alignment axis 114. In turn, this can cause the separation distance 164 to increase, thereby widening the separation between the clamping block 102 and the removal block 116.

In some embodiments, the cold-weld burr removal system 100 is located on a support mount, such as the support mount 152. In some embodiments, the support mount 152 can include a vertical stand and a table or other planar surface with which the clamping block 102 and the removal block 116 are placed. In some embodiments, the clamping block 102 is rigidly or removably attached to the support mount 152 such that when the cold-weld burr removal system 100 is operating, the clamping block 102 does not move relative to the support mount 152. Thus, the clamping block 102 can be considered stationary relative to the support mount 152. Comparatively, the removal block 116 can linearly actuate or move along the alignment axis 114 based on the movement of the linear actuator 146. The linear actuator 146 can be used to move the removal block 116 while the cutting head insert 132 is removably attached to the removal block 116.

As further discussed with respect to FIG. 2, this movement can allow the cutting head insert 132 to provide a shearing force that can remove a cold-weld burr from a rod placed, installed, clamped, or otherwise located within the cold-weld burr removal system 100. While the clamping block 102 remains stationary, the linear actuator 146 can extend a piston and move the removal block 116 in a direction long the alignment axis 114 so as to increase the separation distance 164 between the clamping block 102 and the removal block 116. In some embodiments, the removal block 116 can be located on a rail or track that allows the removal block 116 to slide or otherwise move along the alignment axis 114. The movement of removal block 116 can be in response to the linear actuation initiator 150 prompting or otherwise initiating movement of the linear actuator 146. The cold-weld burr removal system 100 shown in FIGS. 1A and 1B includes two linear actuators 146, although this may not always be the case. In alternate embodiments, one or more than two of the linear actuators 146 may be used to move the removal block 116. In some embodiments, two of the linear actuators 146 can be located on either side of the alignment axis 114. It is understood that the examples are provided for illustration purposes only and should not be construed as limiting the disclosure in any way.

In some embodiments, the cold-weld burr removal system 100 also can include a linear return assembly 154. The linear return assembly 154 can be located such that the removal block 116 is positioned between the clamping block 102 and the linear return assembly 154. The linear return assembly 154 can be configured to react to movement of the removal block 116 due to actuation of the linear actuator 146. Specifically, the linear return assembly 154 can return the removal block 116 back towards the clamping block 102 after the separation distance 164 has increased from its original position. For example, the linear return assembly 154 can include a spring 158 that is coiled around a guide rod 156 that has a length which extends along the alignment axis 114. The spring 158 has a spring length distance 162 that can vary according to the movement of the linear actuator 146. As the linear actuator 146 extends and moves the removal block 116 away from the clamping block 102, the removal block 116 can slide or otherwise move along the guide rod 156 and compress the spring 158 of the linear return assembly 154. As the spring 158 becomes depressed, the spring length distance 162 decreases and potential energy of the spring 158 increases and can be used to return or reposition the removal block 116 back to its original position, and thus decrease the separation distance 164 after it has been increased. In some embodiments, the linear return assembly 154 can include a stopping block 160. The stopping block 160 can attach to the support mount 152 so as to anchor the stopping block 160 in a fixed position. The stopping block 160 can be considered stationary and not move relative to the support mount 152. The guide rod 156 and the spring 158 can be attached to the stopping block 160. In some embodiments where two or more of the linear actuators 146 are used, an equal number of the guide rods 156 and the springs 158 can be used. In other embodiments, one guide rod 156 and one spring 158 can be implemented when two or more of the linear actuators 146 are used. It is understood that the examples are provided for illustration purposes only and should not be construed as limiting the disclosure in any way.

Figure 1C:
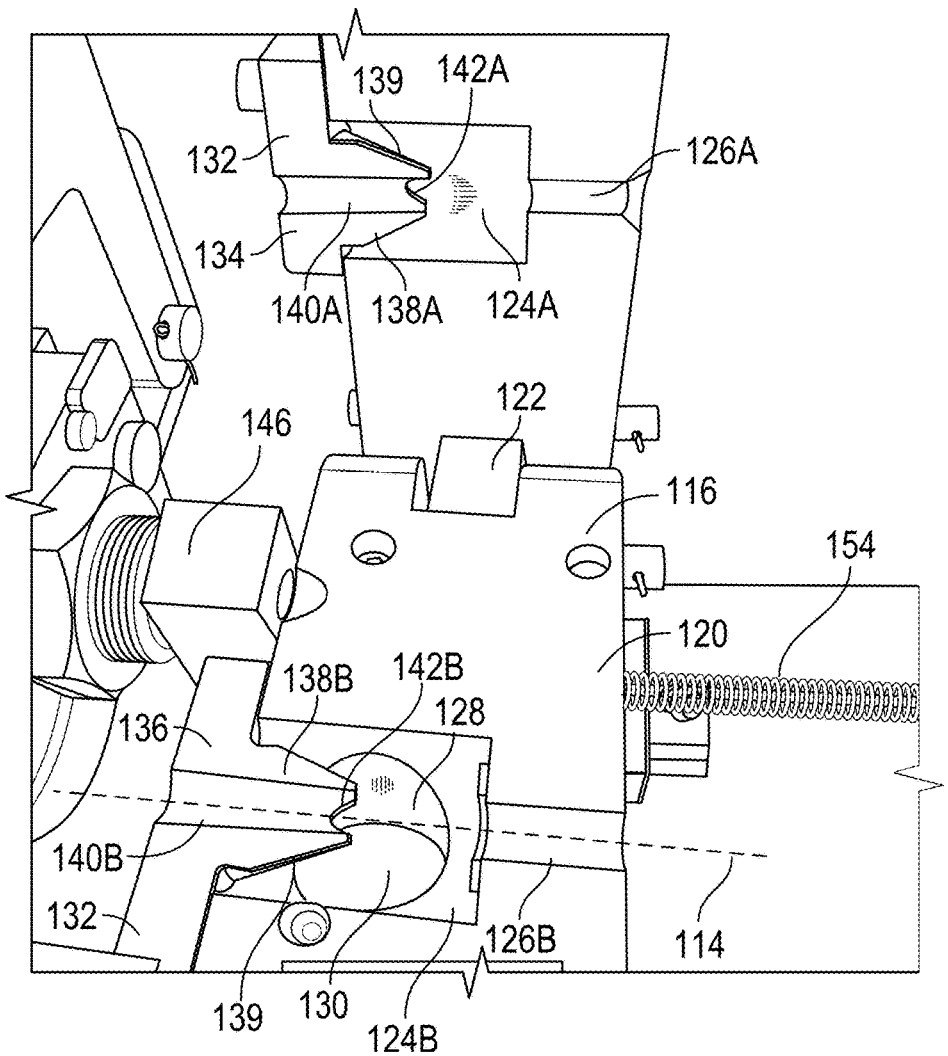
FIG. 1C illustrates a perspective view of a removal block in an open position while a cutting head insert is removably attached, according to illustrative embodiments.

Turning to FIG. 1C with continued discussion of, and reference to, FIGS. 1A and 1B, in some embodiments, the linear actuator 146 can be in contact with the removal block 116, such as via the lower removal block portion 120. As shown in FIG. 1C, the linear actuator 146 is retracted and can place the removal block 116 in an original or starting position. When two of the linear actuators 146 are used, the cutting head insert 132 can be centered about the alignment axis 114 and can be located between two of the linear actuators 146. The cutting head insert 132 can include a cutting passage 140 that has a lower cutting passage portion 140B and an upper cutting passage portion 140A. In some embodiments, each of the lower cutting passage portion 140B and the upper cutting passage portion 140A forms a channel to support the body of the rod. The lower insert portion 136 of the cutting head insert 132 can removably attach to the lower removal block portion 120 via one or more insert connectors 144. Similarly, the upper insert portion 134 of the cutting head insert 132 can removably attach to the upper removal block portion 118 via one or more insert connectors 144. Thus, as the linear actuator 146 extends and moves along the alignment axis 114 in a direction away from the clamping block 102, the cutting head insert 132 will move with the removal block 116. The cutting head insert 132 can extend or protrude into the burr receiving chamber 124.

In some embodiments, the lower removal block portion 120 of the removal block 116 can include a burr transfer passage 128. As shown in FIG. 1C, a lower cutting portion 138B of the cutting head insert 132 can be located above the burr transfer passage 128. For example, in embodiments, the lower chamber portion 124B can define the burr transfer passage 128 that extends in a direction away from the alignment axis 114, such as downward towards a location below the removal block 116. In some embodiments, the cold-weld burr removal system 100 can include a burr collector 130. The burr collector 130 can be a hollow container that is located below the removal block 116 and the burr receiving chamber 124. The burr transfer passage 128 can be configured to extend from the burr receiving chamber 124 to the burr collector 130, thereby creating a passageway through which material can travel. For example, when some or all of a cold-weld burr is separated or otherwise removed from the rod, the structure of the cold-weld burr can fall and/or be guided into the burr transfer passage 128, which in turn guides and/or otherwise transfers some or all of the cold-weld burr into the burr collector 130. Depending on size, the burr collector 130 can collect or otherwise store one or more cold-weld burrs and/or other remnant material removed from the rod, which can be collected and disposed of as needed. The burr transfer passage 128 and the burr collector 130 can move along with the removal block 116. Thus, as the removal block 116 moves due to the linear actuator 146, the burr collector 130 moves as well.

Figure 1D:
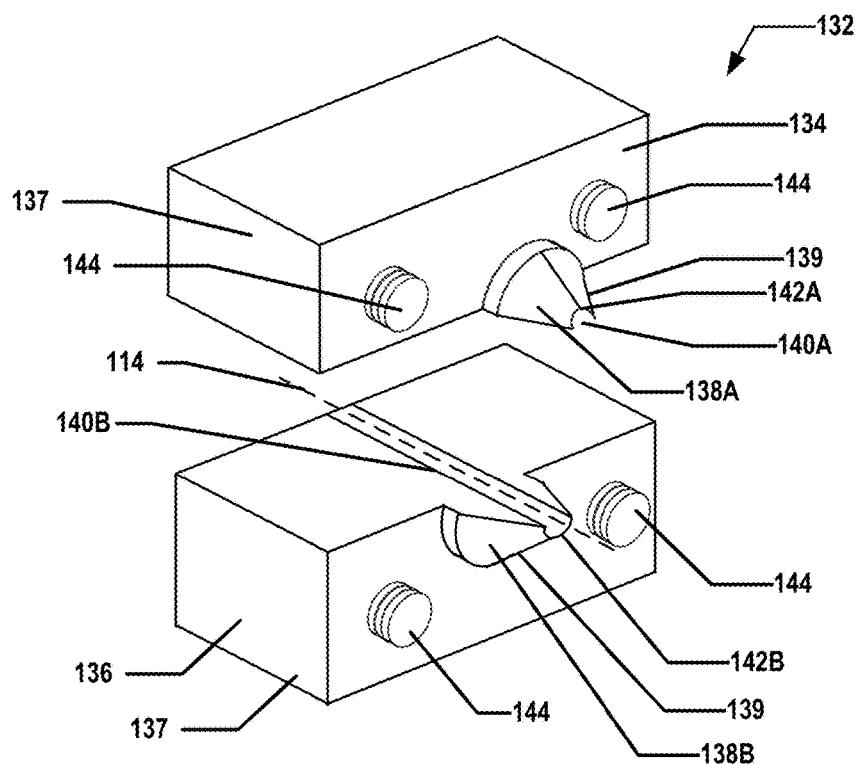
FIG. 1D illustrates an exploded, perspective view of a cutting head insert that is operable with a cold-weld burr removal system, according to an embodiment of the present disclosure.
Figure 1E:
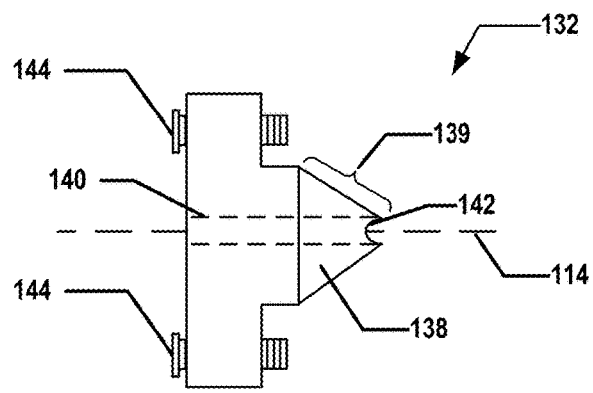
FIG. 1E illustrates a top view showing a portion of the cutting head insert shown in FIG. 1D, according to aspects the present disclosure.

Turning now to FIGS. 1D & 1E with continued discussion of FIGS. 1A-1C, the cold-weld burr removal system 100 also can include a cutting head insert, such as the cutting head insert 132. In embodiments, the cutting head insert 132 can include the upper insert portion 134 and the lower insert portion 136. The cutting head insert 132 can be removably attached to the removal block 116 via one or more of the insert connector 144. Examples of the insert connector 144 include, but should not be limited to, bolts, screws, nuts, clasps, clamps, or other securing mechanisms that secure or otherwise hold the cutting head insert 132 in place relative to the removal block 116. The cutting head insert 132 can include a cutting portion 138, a cutting passage 140, and a cutting edge 142. The cutting portion 138 can include an upper cutting portion 138A and the lower cutting portion 138B. The upper insert portion 134 can define the upper cutting portion 138A and the lower insert portion 136 can define the lower cutting portion 138B. In some embodiments, at least some of the cutting portion 138 can be encapsulated, in part or in whole, by the burr receiving chamber 124 of the removal block 116 when the cutting head insert 132 is removably attached to the removal block 116. The cutting portion 138 and the cutting passage 140 can be centered about the alignment axis 114. The cutting head insert 132 also can have a body portion 137. The body portion 137 can be configured to mount or removably attach the cutting head insert 132 to the removal block 116. The cutting portion 138 of the cutting head insert 132 can be configured to protrude from the body portion 137 and into at least a portion of the burr receiving chamber 124 in response to the cutting head insert 132 being removably attached to the removal block 116.

The cutting portion 138 can define the cutting edge 142. The cutting edge 142 can include an upper cutting edge portion 142A and a lower cutting edge portion 142B. Each of the upper cutting edge portion 142A and the lower cutting edge portion 142B can be configured as a blade or knife that, when the cutting head insert 132 of the removal block 116 moves relative to the stationary rod and cold-weld burr, creates or otherwise provides a shearing force that can remove at least some of the cold-weld burr when the rod is located along the alignment axis 114. The cutting edge 142 can remove the cold-weld burr while the rod remains stationary in the clamping block 102. The cutting edge 142 can be centered around the alignment axis 114 and surround the cutting passage 140. In some embodiments, the clamping passage 110 of the clamping block 102 can have a diameter that is smaller than a diameter of at least a portion of the cutting passage 140 of the cutting head insert 132. This is because the clamping passage 110 can be configured to frictionally grasp or clamp onto a rod, while the cutting passage 140 can be sized to be slightly larger than a diameter of the rod that contains the cold-weld burr. The rod rests within the cutting passage 140 while the cutting head insert 132 and the removal block 116 travel back and forth along the alignment axis 114. The cutting head insert 132 can be configured for a rod with a specific diameter. Thus, in embodiments, the size of the cutting passage 140 can be unique or particular to the cutting head insert 132. Different cutting head inserts can have different diameter cutting passages, and thus can be implemented based on the diameter of the rod containing the cold-weld burr. The body portion 137 can be rectangular in shape, although this may not always be the case. It is understood that the examples are provided for illustration purposes only and should not be construed as limiting the disclosure in any way.

In some embodiments, the cutting portion 138 of the cutting head insert 132 can at least partially resemble a cone with a truncated tip. The cutting portion 138 can define a frustum 139 that is non-uniform in length. The frustum 139 refers to material of the cutting portion 138 that is located between the cutting edge 142 and the body portion 137. The frustum 139 can be non-uniform in length because the distance from the body portion 137 to a point on the cutting edge 142 can vary. This can be due to the cutting edge 142 having a cross-section that is shaped like the letter "U" when viewed orthogonal to the cutting passage 140, such as shown in FIG. 1E. The "U" shape is created because each of the upper cutting edge portion 142A and the lower cutting edge portion 142B of the cutting edge 142 can have a semi-circle that forms an acute angle with the alignment axis 114. The cutting edge 142 can surround the rod when the rod is placed along the alignment axis 114. Because the length of the frustum 139 of the cutting portion 138 is non-uniform, the cutting edge 142 can have more surface area than a conventional edge that is uniform in length. In embodiments, each of the upper cutting edge portion 142A and the lower cutting edge portion 142B can separate the material of the cold-weld burr into one or more pieces as the cutting edge 142 moves along the alignment axis 114, around the circumference of the rod.

Figure 1F:
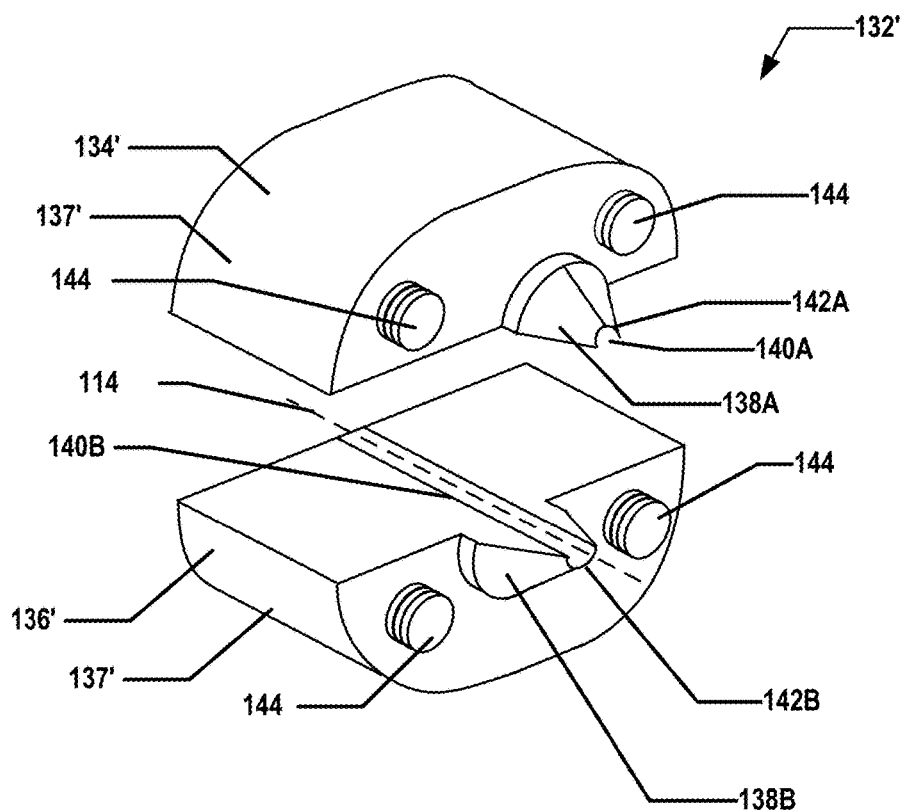
FIG. 1F illustrates an exploded, perspective view of a cutting head insert that is operable with a cold-weld burr removal system, according to another embodiment of the present disclosure.
Figure 1G:
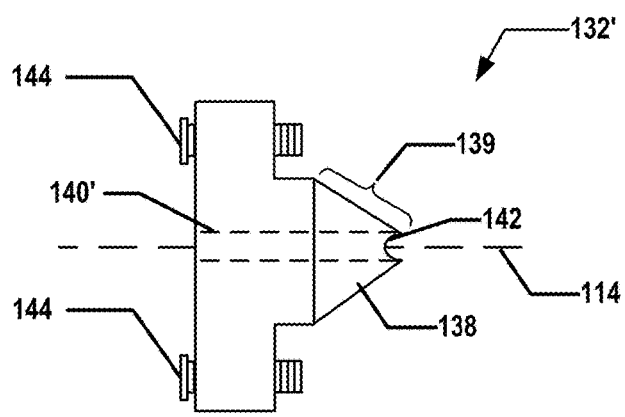
FIG. 1G illustrates a top view showing a portion of the cutting head insert shown in FIG. 1F, according to aspects the present disclosure.

Turning now to FIGS. 1F and 1G, a cutting head insert, such as the cutting head insert 132', can be implemented within the cold-weld burr removal system 100, according to another embodiment of the present disclosure. The cutting head insert 132' is substantially similar to the cutting head insert 132 from FIGS. 1D and 1E. For example, the cutting head insert 132' can be implemented within the cold-weld burr removal system 100 to facilitate removal of a cold-weld burr from a rod. Thus, the cutting head insert 132' can have elements in common with the cutting head insert 132, which for clarity, are numbered the same and discussed with respect to FIGS. 1D and 1E. Therefore, for clarity, distinctions from the cutting head insert 132 will be discussed. The cutting head insert 132' can have an upper insert portion 134' and a lower insert portion 136'. The cutting head insert 132' can include a body portion 137' and the cutting portion 138, which can protrude from the body portion 137' in a direction along the alignment axis 114. The body portion 137' can be made up of a portion of the upper insert portion 134' and the lower insert portion 136'. As shown in FIG. 1F, the body portion 137' has rounded corners or edges. In some embodiments, the body portion 137' is at least partially located within the burr receiving chamber 124. The part of the body portion 137' that will be located in the burr receiving chamber 124 can be configured to complement the shape of the burr receiving chamber 124 of the removal block 116 from the cold-weld burr removal system 100. For example, as shown in FIGS. 1B and 1C, the burr receiving chamber 124 is shaped substantially like a cylinder, where the upper chamber portion 124A is configured to be a portion of the cylinder and the lower chamber portion 124B is configured to provide the remaining portion of the cylinder. As such, the body portion 137' can have a cylindrical shape so that the upper insert portion 134' of the cutting head insert 132' can be located within the upper chamber portion 124A of the removal block 116, and the lower insert portion 136 of the cutting head insert 132' can be located within the lower chamber portion 124B of the removal block 116. In some embodiments, the shape of the body portion 137' may not be entirely cylindrical, but rather have rounded corners and/or edges that have a chamfer, billet, or fillet that is shaped to compliment or otherwise match the shape of the burr receiving chamber 124. In some embodiments, at least some of the body portion 137' is located outside of the burr receiving chamber 124 and can attach to the removal block 116 via one or more insert connectors, such as the insert connectors 144. It is understood that the examples are provided for illustration purposes only and should not be construed as limiting the disclosure in any way.

Figure 2A:
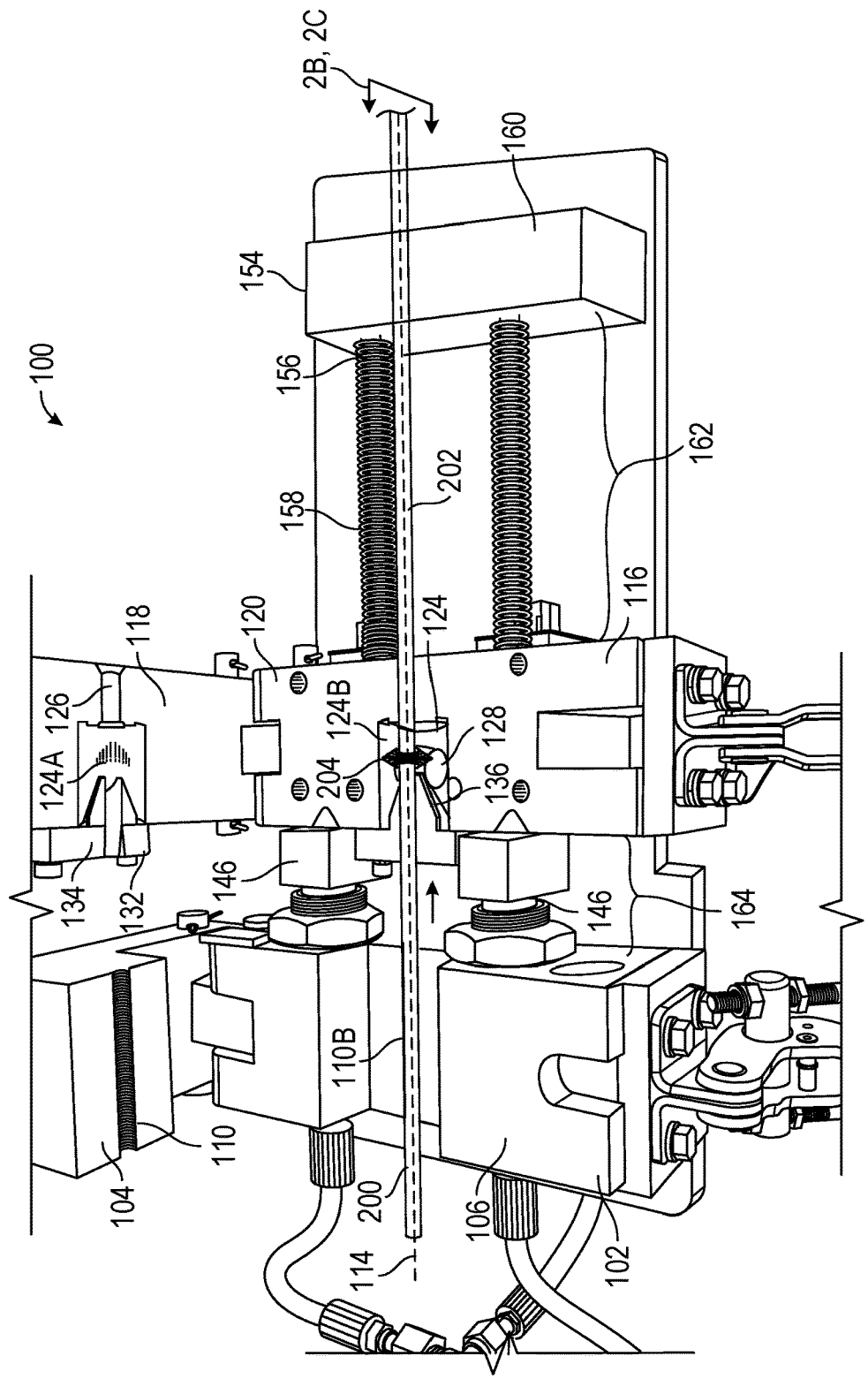
FIG. 2A illustrates a perspective view in which a rod with a cold-weld burr is placed in a cold-weld burr removal system, according to concepts of the present disclosure.

Turning now to FIG. 2A with reference to FIGS. 1A-1E, a perspective view in which a rod 200 with a cold-weld burr 204 is oriented for removal by the cold-weld burr removal system 100 is disclosed, according to an embodiment. As shown in FIG. 2A, the clamping block 102 and the removal block 116 are in the open position. The rod 200 initially includes a rod body 202 and the cold-weld burr 204. The rod body 202 can be in the shape of a cylinder and is formed by one or more pieces of material, such as aluminum, copper, brass, or other materials. The cold-weld burr 204 is at a location on the rod body 202 where two pieces of material are joined together through a cold-weld process. The lower clamp portion 106 of the clamping block 102 can receive the rod body 202 along the alignment axis 114 via the lower clamping passage portion 110B. The portion of the rod body 202 that is placed in the lower clamping passage portion 110B should ensure that the cold-weld burr 204 is located at least partially within the lower chamber portion 124B of the burr receiving chamber 124. After the rod body 202 is placed along the lower clamping passage portion 110B, the upper clamp portion 104 can close on top of the rod body 202 so as to form the clamping passage 110. The clamping passage 110 can be in frictional contact with the outer surface of at least a portion of the rod body 202, thereby applying a normal force that clamps or otherwise secures the rod 200 in place so that relative motion is reduced and/or eliminated between the clamping block 102 and the rod 200.

The lower insert portion 136 of the cutting head insert 132 can hold the rod body 202 that is adjacent to the cold-weld burr 204. The guide passage 126 of the removal block 116 can hold another portion of the rod body 202 that is adjacent to the cold-weld burr 204. This can allow the cold-weld burr 204 to be at least partially located within the lower chamber portion 124B while the removal block 116 is in the open position. When the upper removal block portion 118 rotates to be on top of the lower removal block portion 120, the removal block 116 is in the closed position. This allows the upper chamber portion 124A of the burr receiving chamber 124 to cover the cold-weld burr 204 and the upper insert portion 134 to cover the portion of the rod body 202 that is resting in the lower insert portion 136. As such, the burr receiving chamber 124 can encompass the cold-weld burr 204. Prior to removal of the cold-weld burr 204 from the rod body 202, the linear actuator 146 is retracted so as to create the separation distance 164 between the clamping block 102 and the removal block 116 that is at a minimum distance. When the separation distance 164 between the clamping block 102 and the removal block 116 is at the minimum distance, the removal block 116 is a maximum distance away from the linear return assembly 154, which is measured by the spring length distance 162 of the spring 158 of the linear return assembly 154. This means that as the linear actuator 146 moves the removal block 116 away from the clamping block 102, the separation distance 164 between the clamping block 102 and the removal block 116 increases, and in turn the spring length distance 162 decreases. This is because the spring 158 can compress as the removal block 116 is moving towards the stopping block 160. The separation distance 164 is at a minimum length when the spring length distance 162 is at a maximum length, and vice-versa.

Turning to FIGS. 2B and 2C with continued discussion and reference to FIG. 2A, the cold-weld burr removal system 100 is shown, respectively, before and after the cold-weld burr 204 is removed from the rod body 202 of the rod 200. The actuation connector 148 can provide energy (e.g., air pressure or hydraulic fluid) to the linear actuator 146 that, in turn, moves the removal block 116 in a direction towards the stopping block 160. As the removal block 116 moves towards the stopping block 160, the separation distance 164 increases and the spring length distance 162 decreases. The cutting edge 142 of the cutting head insert 132 can shear the cold-weld burr 204 from the rod body 202 as the removal block 116 is moved by the linear actuator 146 away from the clamping block 102, thereby causing the cold-weld burr 204 to be removed from the rod body 202. In some embodiments, the cutting edge 142 can break the cold-weld burr 204 into more than one piece because the upper cutting edge portion 142A is independent from the lower cutting edge portion 142B, and thus can allow for the cold-weld burr 204 to separate from the rod body 202 while remaining surrounded by the burr receiving chamber 124. Once separated from the rod body 202, the cold-weld burr 204 (or pieces thereof) can fall into the lower chamber portion 124B, through the burr transfer passage 128, and into the burr collector 130. The rod body 202 can be substantially uniform in diameter along the length of the rod body 202 once the cold-weld burr 204 is removed. When the cutting head insert 132 removes the cold-weld burr 204, or portions thereof, from the rod body 202, the separation distance 164 between the clamping block 102 and the removal block 116 has increased and can be at a maximum length, while the spring length distance 162 (measured between the removal block 116 and the stopping block 160) has decreased and can be at a minimum length. In some embodiments, as the removal block 116 moves towards the stopping block 160 and the spring 158 compresses, at least a portion of the guide rod 156 can protrude into a guide rod opening 127 of the removal block 116. The spring 158 of the linear return assembly 154 can return the removal block 116 back towards the clamping block 102 by the linear actuator 146 retracting and the spring 158 of the linear return assembly 154 exerting a linear force against the removal block 116 in the direction towards the clamping block 102 and substantially parallel to the alignment axis 114. The removal block 116 can move along one or more of the guide rod 156 as the spring 158 forces the removal block 116 back towards the clamping block 102 until the separation distance 164 between the clamping block 102 and the removal block 116 is at a minimum length. Once the cold-weld burr 204 is removed from the rod body 202 and the removal block 116 is back in a starting position (i.e., where the separation distance 164 between the clamping block 102 and the removal block 116 is at a minimum length), then the removal block 116 and the clamping block 102 can be opened, and the rod 200 removed from the cold-weld burr removal system 100.

Figure 3:
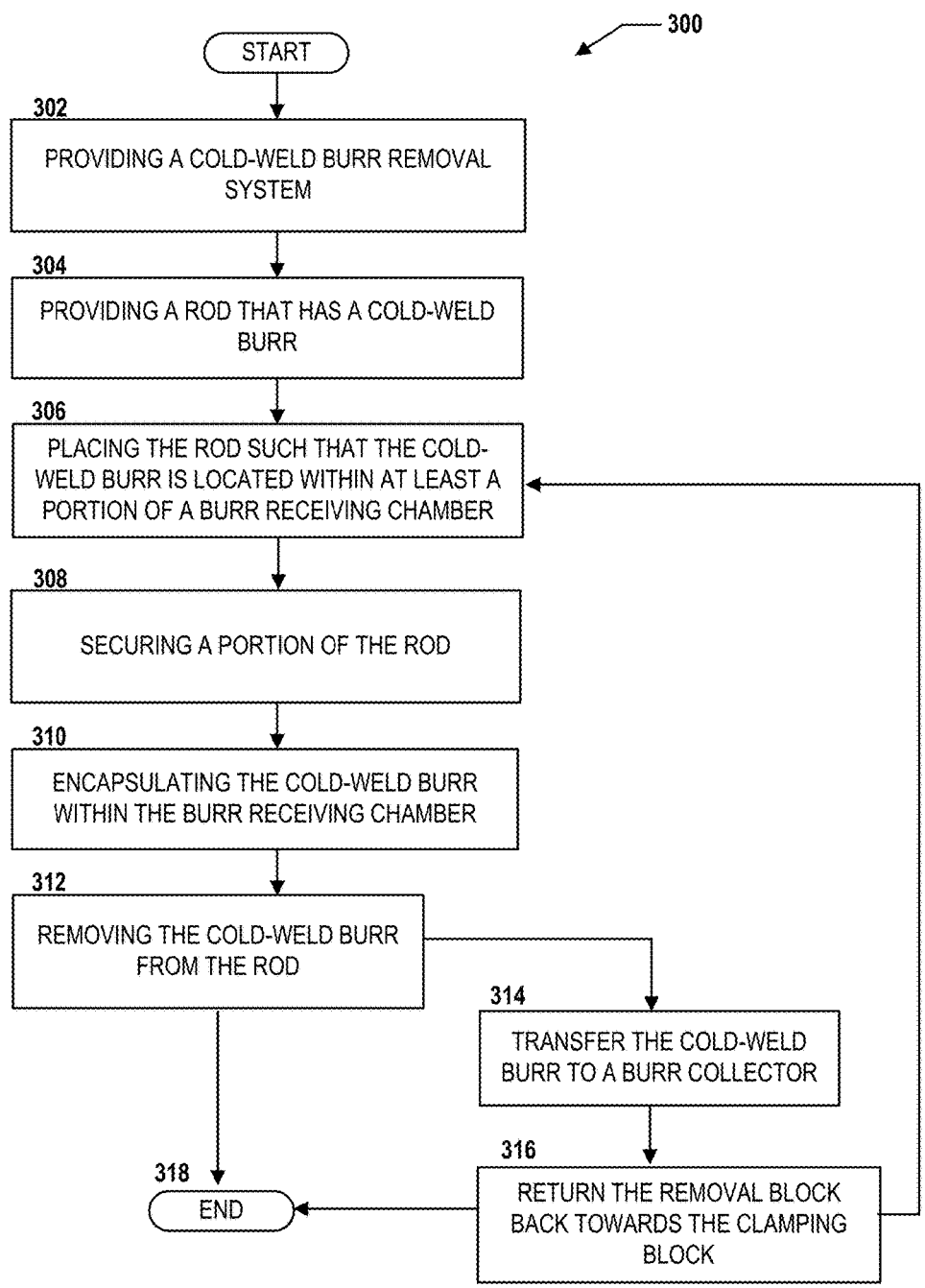
FIG. 3 is a flow diagram illustrating aspects of a method of removing a cold-weld burr from a rod, according to illustrative embodiments of the present disclosure.

Turning now to FIG. 3, a method 300 of removing a cold-weld burr from a rod will be described, according to an illustrative embodiment. It should be understood that removal of a cold-weld burr can include the operation of a cold-weld burr removal system and corresponding elements discussed herein, including but not limited to the cold-weld burr removal system 100 operating to remove the cold-weld burr 204 from the rod body 202 of the rod 200, referenced in FIGS. 1A-1G and FIG. 2. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It also should be understood that the methods disclosed herein can be ended at any time and need not be performed in its entirety.

The method 300 begins at operation 302, which includes providing the cold-weld burr removal system 100. The cold-weld burr removal system 100 can include the clamping block 102, the removal block 116, the cutting head insert 132 and one or more of the linear actuator 146. The cutting head insert 132 can be removably attached to the removal block 116 via one or more of the insert connectors 144. The linear actuator 146 can connect the clamping block 102 to the removal block 116 so as to allow and/or provide for linear movement of the removal block 116 along the alignment axis 114 in a direction away from the clamping block 102. In some embodiments, the cold-weld burr removal system 100 also can include the linear return assembly 154 that includes the guide rod 156 and the spring 158. In embodiments, the removal block 116 can include or otherwise define the burr receiving chamber 124. The burr receiving chamber 124 can be configured to accept or otherwise receive the cold-weld burr 204 while it is attached to the rod body 202 of the rod 200.

From operation 302, the method 300 proceeds to operation 304, which includes providing a rod that has a cold-weld burr, such that the rod 200 that has the cold-weld burr 204 attached to the rod body 202 due to a cold-weld process that joined two pieces of material together. The rod 200 can be cylindrical in shape. The cold-weld burr 204 can have the shape of two cones that are connected together at the base of each cone, thereby creating excess material that has a diameter that is larger than a diameter of the rod body 202 of the rod 200. In embodiments, the rod 200 can be made of copper, aluminum, brass, combinations thereof, or other metal. Although the term "rod" is used, it should be understood that wire or other elongated strips of metal material can undergo a cold-weld process that produces a burr, such as the cold-weld burr 204 shown in FIGS. 2A-2C. Thus, the examples provided are for illustration purposes only and should not be used to limit the present disclosure.

From operation 304, the method 300 proceeds to operation 306, which includes placing the rod 200 along the alignment axis 114 such that the cold-weld burr 204 is at least partially located within at least a portion of the burr receiving chamber 124. For example, the rod body 202 of the rod 200 can be located within the lower cutting passage portion 140B such that a portion of the cold-weld burr 204 protrudes or is otherwise located within the lower chamber portion 124B of the burr receiving chamber 124. The cutting edge 142 can be facing the cold-weld burr 204. The cold-weld burr 204 is placed along the alignment axis 114 such that the cold-weld burr 204 is located between the cutting portion 138 of the cutting head insert 132 and the guide passage 126 of the removal block 116. The cold-weld burr 204 attached to the rod 200 can be positioned while the clamping block 102 and the removal block 116 are in an open position.

From operation 306, the method 300 proceeds to operation 308, which includes securing, via the clamping block 102, a portion of the rod 200 while the cold-weld burr 204 is located within at least the portion of the burr receiving chamber 124. The upper clamp portion 104 can close on top of the lower clamp portion 106 so that the clamping block 102 is in the closed position to secure a portion of the rod 200. The clamping passage 110 can surround the rod body 202 of the rod 200 so as to be in frictional contact and prevent movement of the rod 200 along the alignment axis 114. In embodiments, the clamping block retainer 112 can be secured via a normal force to ensure frictional contact between the surface of the clamping passage 110 of the clamping block 102 and the rod body 202. The rod 200 remains secured within the clamping passage 110 by the clamping block 102 while the cold-weld burr 204 is being removed from the rod 200. As such, the rod 200 does not move, or moves only marginally, relative to the clamping block 102 while the removal block 116 is moving along the alignment axis 114 to facilitate removal of the cold-weld burr 204 from the rod body 202.

From operation 308, the method 300 proceeds to operation 310, where the cold-weld burr 204 can be encapsulated within the burr receiving chamber 124 of the removal block 116. This can occur by the upper removal block portion 118 closing on top of the lower removal block portion 120 so that the guide passage 126 of the removal block and the cutting passage 140 of the cutting head insert 132 surround separate portions of the rod body 202 located on either side of the cold-weld burr 204. The cold-weld burr 204 can be encapsulated when the removal block 116 is in a closed position. In embodiments, the removal block retainer 129 can be secured to ensure that the removal block 116 remains in the closed position, and that the cold-weld burr 204 remains encapsulated, while the removal block 116 is moving along the alignment axis 114.

From operation 310, the method 300 proceeds to operation 312, which includes removing the cold-weld burr 204 from the rod 200 by moving, via the linear actuator 146, the removal block 116 away from the clamping block 102 so as to provide a shearing force that separates the cold-weld burr 204 from the rod body 202 of the rod 200. As the separation distance 164 increases, the cutting edge 142 of the cutting head insert 132 moves towards the cold-weld burr 204, which is held in place by the clamping block 102. The cutting passage 140 moves along the alignment axis 114 and over the rod body 202 while the removal block 116 is moving towards the stopping block 160 of the linear return assembly 154. As the removal block 116 moves away from the clamping block 102, the cutting edge 142 comes into contact with the cold-weld burr 204 with enough momentum and speed so as to provide a shearing force that separates or otherwise removes at least a portion of the cold-weld burr 204 from the rod body 202 of the rod 200. The movement of the removal block 116, which increases the separation distance 164 between the clamping block 102 and the removal block 116, can occur within a few seconds. In some embodiments, from operation 312, the method 300 proceeds to operation 318, where the method 300 ends.

In other embodiments, from operation 312, the method 300 can proceed to operation 314, which includes transferring, via the burr transfer passage 128, the cold-weld burr 204 to the burr collector 130. The burr collector 130 can be located underneath the removal block 116. In embodiments, the burr collector 130 can move with the removal block 116. Thus, when the linear actuator 146 moves the removal block 116 and increases the separation distance 164 between the clamping block 102 and the removal block 116, the burr collector 130 also can move. This can allow the burr collector 130 to catch, capture, or otherwise contain the cold-weld burr 204 while the removal block 116 is in motion and/or prior to the rod 200 being removed from the removal block 116.

From operation 314, the method 300 proceeds to operation 316, which includes the linear return assembly 154 of the cold-weld burr removal system 100 returning the removal block 116 back towards the clamping block 102 after removing the cold-weld burr 204 from the rod 200. When the spring length distance 162 is at a minimum, the spring 158 has maximum potential energy, which can be released when the linear actuator 146 stops pushing or otherwise moving the removal block 116 towards the stopping block 160. In some embodiments, the linear actuator 146 can stop pushing the removal block 116 prior to the spring 158 being fully compressed and the separation distance 164 being at a maximum distance. The spring 158 can drive the removal block 116 back towards the clamping block 102, thereby decreasing the length of the separation distance 164 and increasing the length of the spring length distance 162. The removal block 116 can return back to its original starting position when the separation distance 164 is at a minimum and the spring length distance 162 is at a maximum. In embodiments, the removal block 116 can be opened by releasing the removal block retainer 129, and the clamping block 102 can be opened by releasing the clamping block retainer 112. The rod body 202 of the rod 200 can be inspected by a technician to ensure that enough of the cold-weld burr 204 has been removed from the rod body 202. In some embodiments, from operation 316, the method 300 can repeat operations 306 through 316 if the technician determines that not enough or all of the cold-weld burr 204 has been removed from the rod body 202 of the rod 200. In some embodiments, the burr collector 130 can be detached or removed from the cold-weld burr removal system 100 so as to empty the contents therein, such as any material pieces of the cold-weld burr 204 that have been removed from the rod 200. From operation 316, the method 300 can proceed to operation 318, where the method 300 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A cold-weld burr removal system comprising:
   a clamping block comprising a clamping passage that extends along an alignment axis;
   a removal block comprising a guide passage centered about the alignment axis, wherein the removal block defines a burr receiving chamber;
   a cutting head insert removably attached to the removal block, the cutting head insert comprising a cutting portion and a cutting passage centered about the alignment axis, wherein the cutting portion protrudes into the burr receiving chamber; and
   a linear actuator that connects the clamping block to the removal block, wherein the linear actuator moves the removal block in a direction along the alignment axis to increase a separation distance between the clamping block and the removal block in response to a linear actuation initiator initiating movement of the linear actuator.

2. The cold-weld burr removal system of claim 1, further comprising a linear return assembly that returns the removal block back towards the clamping block after the separation distance has increased.

3. The cold-weld burr removal system of claim 1, wherein the clamping block comprises a hinge, an upper clamp portion, and a lower clamp portion, wherein the clamping block opens via the hinge so as to allow the clamping passage to receive a portion of a rod.

4. The cold-weld burr removal system of claim 3, wherein the removal block comprises a removal block hinge, an upper removal block portion, and a lower removal block portion, wherein the removal block opens via the removal block hinge so as to allow the burr receiving chamber to receive a cold-weld burr attached to a portion of the rod.

5. The cold-weld burr removal system of claim 4, wherein the burr receiving chamber encapsulates at least a portion of the cutting head insert.

6. The cold-weld burr removal system of claim 1, wherein the cutting portion defines a frustum that is non-uniform in length, wherein the cutting passage extends through the frustum along the alignment axis.

7. The cold-weld burr removal system of claim 6, wherein the clamping passage is configured to have a diameter that is smaller than a diameter of at least a portion of the cutting passage.

8. The cold-weld burr removal system of claim 1, wherein the cutting portion comprises a cutting edge that removes at least some of a cold-weld burr from a rod.

9. The cold-weld burr removal system of claim 1, further comprising a burr collector, wherein the removal block defines a burr transfer passage that extends from the burr receiving chamber to the burr collector.

10. A cold-weld burr removal system comprising:
    a clamping block comprising a clamping passage that extends along an alignment axis;
    a removal block comprising a guide passage centered about the alignment axis, wherein the removal block defines a burr receiving chamber;
    a cutting head insert removably attached to the removal block, the cutting head insert comprising a cutting portion and a cutting passage centered about the alignment axis, wherein the cutting portion protrudes into the burr receiving chamber;
    at least two linear actuators that connect the clamping block to the removal block, wherein each linear actuator moves the removal block in a direction along the alignment axis to increase a separation distance between the clamping block and the removal block in response to a linear actuation initiator initiating movement of the linear actuator; and
    a linear return assembly that returns the removal block back towards the clamping block after the separation distance has increased.

11. The cold-weld burr removal system of claim 10, wherein the burr receiving chamber accepts a cold-weld burr of a rod, and wherein a cutting edge of the cutting head insert removes the cold-weld burr while the rod remains stationary in the clamping block.

12. The cold-weld burr removal system of claim 10, wherein the clamping block comprises a hinge, an upper clamp portion, and a lower clamp portion, wherein the clamping block opens via the hinge so as to allow the clamping passage to receive a portion of a rod.

13. The cold-weld burr removal system of claim 12, wherein the removal block comprises a removal block hinge, an upper removal block portion, and a lower removal block portion, wherein the removal block opens via the removal block hinge so as to allow the burr receiving chamber to receive a cold-weld burr attached to a portion of the rod.

14. The cold-weld burr removal system of claim 10, wherein the burr receiving chamber encapsulates at least a portion of the cutting head insert.

15. The cold-weld burr removal system of claim 10, wherein the cutting portion defines a frustum that is non-uniform in length, wherein the cutting passage extends through the frustum along the alignment axis.

16. The cold-weld burr removal system of claim 15, wherein the clamping passage is configured to have a diameter that is smaller than a diameter of at least a portion of the cutting passage.

17. The cold-weld burr removal system of claim 10, wherein the cutting portion comprises a cutting edge that removes at least some of a cold-weld burr from a rod.

18. The cold-weld burr removal system of claim 10, further comprising a burr collector, wherein the removal block defines a burr transfer passage that extends from the burr receiving chamber to the burr collector.

19. A method of removing a cold-weld burr from a rod, the method comprising:

providing a cold-weld burr removal system that comprises a clamping block, a removal block, a cutting head insert attached to the removal block, and a linear actuator that connects the clamping block to the removal block so as to allow for linear movement of the removal block along an alignment axis, wherein the removal block comprises a burr receiving chamber;

providing the rod that comprises the cold-weld burr;

placing the rod along the alignment axis such that the cold-weld burr is located within at least a portion of the burr receiving chamber;

securing, via the clamping block, a portion of the rod while the cold-weld burr is located within at least the portion of the burr receiving chamber;

encapsulating, via the removal block, the cold-weld burr within the burr receiving chamber; and removing the cold-weld burr from the rod by moving, via the linear actuator, the removal block away from the clamping block so as to provide a shearing force that separates the cold-weld burr from the rod.

20. The method of claim 19, further comprising:

transferring, via a burr transfer passage, the cold-weld burr to a burr collector that is located underneath the removal block; and returning, via a linear return assembly of the cold-weld burr removal system, the removal block back towards the clamping block after removing the cold-weld burr from the rod.

\* \* \* \* \*